A. A. DAME.
Flange Union.

No. 139,877.  Patented June 17, 1873.

WITNESSES
James I. Kay
Frederick Standish

INVENTOR
Augustus A. Dame
by Bakewell, Christy & Kerr
his Att'ys

UNITED STATES PATENT OFFICE.

AUGUSTUS A. DAME, OF TITUSVILLE, PENNSYLVANIA.

IMPROVEMENT IN FLANGE-UNIONS.

Specification forming part of Letters Patent No. 139,877, dated June 17, 1873; application filed April 18, 1873.

*To all whom it may concern:*

Be it known that I, AUGUSTUS A. DAME, of Titusville, in the county of Crawford and State of Pennsylvania, have invented a new and useful Improvement in Flange-Union; and I do hereby declare the following to be a full, clear, and exact description thereof, reference being had to the accompanying drawings making a part of this specification, in which—

Figure 1:
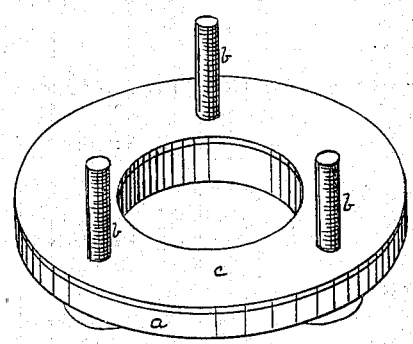
Figure 2:
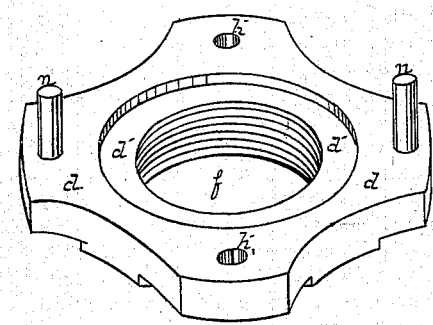
Figure 3:
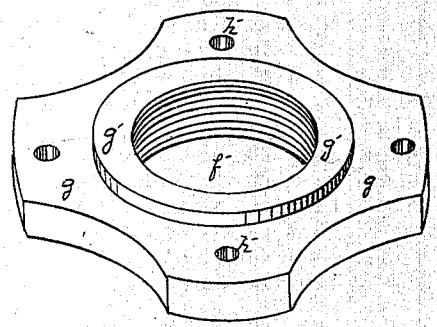
Figure 4:
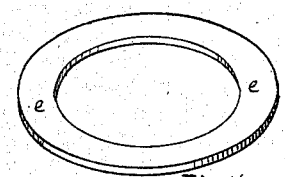
Figure 5:
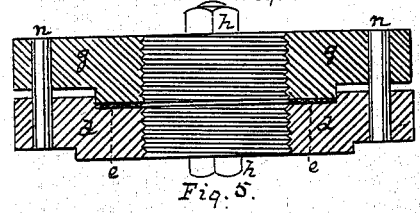

Figure 1 is a view in perspective of one half the ordinary flange-union with a gasket thereon and bolts. Fig. 2 is a view in perspective of the female half of my improved flange-union showing the inner face thereof. Fig. 3, by a like view, shows the inner face of the male half. Fig. 4 is a like view of the gasket; and Fig. 5 is a sectional view of my improved flange-union complete.

Like letters of reference indicate like parts in each.

In the ordinary flange-union two flat disks, one of which is represented at $a$, are employed, and the two are secured together by means of bolts $b$, and nuts with an interposed gasket, $c$. Each half of this flange-union must be planed off carefully, on its inner face, or ground to a perfect level, and where the gasket $c$ is employed bolt-holes must be cut, as shown in Fig. 1. By my improvement I save a greater part of the expense of planing or grinding, save a considerable part of the cost of the gasket, and make a flange-union which, at less expense, will give a tighter joint.

To enable others skilled in the art to make and use my invention, I will proceed to describe its construction and manner of use.

The female half $d$ is cast with an annular seat, $d'$, around the tapped eye $f$, such seat being of suitable depth to receive the annular gasket $e$. The male half $g$ of the union is made with a raised annular washer, $g'$, around the tapped eye $f$, of such form that when the two halves are put together and compressed together by means of screws, bolts, and nuts $h$, in the bolt-holes $h'$, or in other suitable way, the raised washer $g'$ will bear on the gasket $e$ and make a tight joint. The depth of the recess $d'$, the thickness of the gasket $e$, and the height of the washer $g$, are relatively such that when the two halves are compressed together with the requisite degree of compression, a tight joint will be secured before or by the time the outer (outside the recess) and the washer come together, and preferably before; so that when the two halves of the union are tightened together in the manner set forth, they will be exercising their compressive force outside of and at a little distance from the annular seat thus formed, and give a more secure joint around the seat. Also, these parts should be relatively such as to secure the same useful function with different thicknesses of gasket.

In order that the two half couplings described may not, in moving or removing, or in being secured onto the pipe, turn on each other, I bind them together by means of dowel-pins $n$, or what is mechanically the same thing, by means of a raised part on the inner face of one entering a correspondingly-shaped recess on the inner face of the other, at or near to the opposite edges.

The forms of such ribs or elevations and recesses may be varied at pleasure. In this way I prevent one-half of the coupling turning on the other, even before the bolts are inserted, and thereby prevent the gasket being rubbed up or kinked into ribs, which would spoil the joint.

By this construction, as it is only necessary to turn out the recess $d'$, and plane the face of the washer $g'$, I save a portion of the expense ordinarily involved in planing the entire face of the half coupling shown in Figure 1. I also save a larger part of the material which goes to make the gasket of Fig. 1; and by reducing the radial area of the bearing part of the joint, and putting the bolts outside of it, I am enabled to secure a tighter joint and one less liable to get out of order.

I am aware that pipes have been coupled together by the end of one pipe being brought against a gasket on a depressed seat in the end of the other, the two being held together by bolts and lugs, but such a device requires that the ends of the pipe should be specially fitted up for the purpose. My improved flange-union is made and fitted up independently of the pipe to which it is to be attached, and by its construction is adapted for insertion in the line of pipe at any point wherever in laying the pipe such a joint may be required.

What I claim as my invention, and desire to secure by Letters Patent, is—

1. An improved flange-union, consisting of the female and male blocks, $d\ g$, each having a tapped eye, $f$, and exterior bolt-holes $h'$, the female part $d$ being provided with a depressed gasket-seat, $d'$, and the male part $g$ with a raised washer, $g'$, substantially as set forth.

2. The arrangement of interlocking uneven surfaces outside the recess-gasket and washer in a flange-union, substantially as set forth.

In testimony whereof I, the said AUGUSTUS A. DAME, have hereunto set my hand.

AUGUSTUS A. DAME.

Witnesses:
J. A. NEILL,
W. B. McMANUS.